United States Patent [19]

Nguyen et al.

[11] Patent Number: 6,035,125
[45] Date of Patent: Mar. 7, 2000

[54] METHOD AND SYSTEM FOR GENERATING COMPACT CODE FOR THE LOOP UNROLLING TRANSFORMATION

[75] Inventors: Khoa Nguyen, San Jose, Calif.; Vivek Sarkar, Newton, Mass.

[73] Assignee: International Business Machines Corporation, Armonk, N.Y.

[21] Appl. No.: 08/900,809

[22] Filed: Jul. 25, 1997

[51] Int. Cl.[7] .................................................. G06F 9/445
[52] U.S. Cl. ............................................................. 395/709
[58] Field of Search .................................... 395/709, 704, 395/706, 708

[56] References Cited

U.S. PATENT DOCUMENTS

| | | | |
|---|---|---|---|
| 5,121,498 | 6/1992 | Gilbert et al. | 395/708 |
| 5,430,850 | 7/1995 | Papadopoulos et al. | 709/30 |
| 5,560,029 | 9/1996 | Papadopoulos et al. | 712/25 |
| 5,704,053 | 12/1997 | Santhanam | 712/207 |
| 5,770,894 | 6/1998 | Agarwal | 395/706 |
| 5,790,859 | 8/1998 | Sarkar | 395/704 |
| 5,797,013 | 8/1998 | Mahadevan et al. | 395/709 |
| 5,842,022 | 11/1998 | Nakahira et al. | 395/709 |
| 5,930,510 | 7/1999 | Beylin et al. | 395/709 |
| 5,950,003 | 9/1999 | Kaneshiro et al. | 395/704 |

OTHER PUBLICATIONS

Title: "A Comparative Evaluation of Sofware Technique to Hide Memory Latency", Author: Kurjan eta al, Source: IEEE, 1995.

Title: "Combining Loop Trnasformations Considering Caches and Scheduling", Author: Wolf et al, source: IEEE, 1996.

Title: "Optimal Sofware Pipelining of Nested Loops", Author: J. Ramanujam, Source: IEEE, 1994.

*Primary Examiner*—Tariq R. Hafiz
*Assistant Examiner*—Chameli Chaudhuri Das
*Attorney, Agent, or Firm*—Gates & Cooper

[57] ABSTRACT

A loop unrolling trasformation specified by loop unrolling factors UF[1], . . . , UF[k] is performed on a perfect nest of k multiple loops to produce an unrolled loop representation as follows. Moving from the outermost loop to the innermost loop of the nest, the unroll factor UF[j] of the current loop is examined. First, the separate unrolled loop body is expanded by the specified unroll factor UF[j]. Second, the loop header for the current loop is adjusted so that if the loop's iteration count, COUNT[j], is known to be less than or equal to the unroll factor, UP[j], then the loop header is simply an assignment of the index variable to the lower-bound expression; otherwise, the loop header is adjusted so that the unrolled loop's iteration count equals $\lfloor COUNT[J]/UF[J] \rfloor$ a rounded down truncation of the division. Third, a remainder loop nest is generated, if needed. The size of the generated code when unrolling multiple nested loops is substantially reduced. The proportion of the object code comprising lower execution frequency remainder loops is also substantially reduced. The compile-time of unrolled multiple nested loops is also substantially reduced.

18 Claims, 8 Drawing Sheets

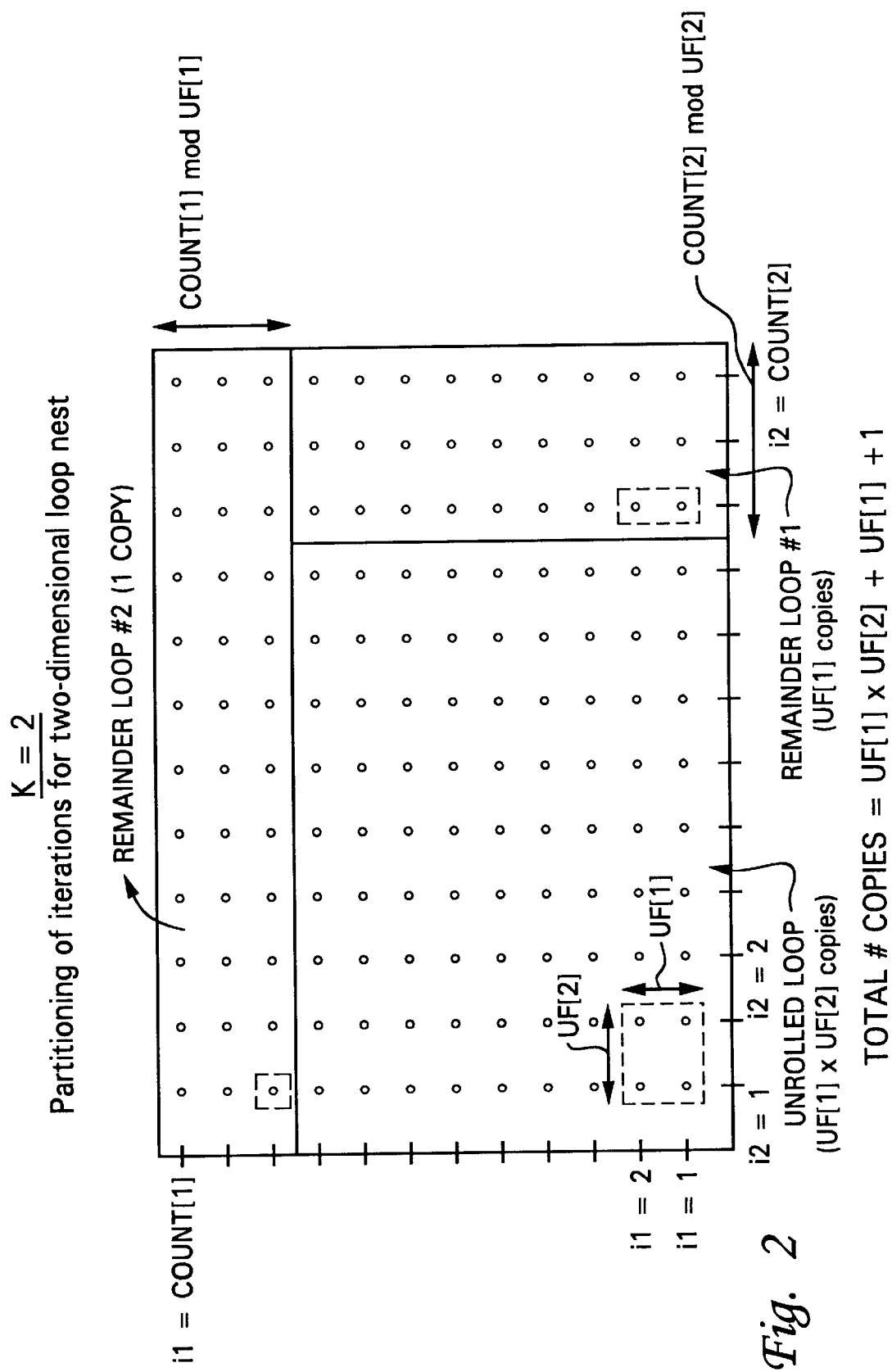
Fig. 2 Partitioning of iterations for two-dimensional loop nest

INPUTS:
1. LOOP[1]...LOOP[k], a perfect nest of k loops, numbered from outermost to innermost, in an optimizer intermediate representation.
   The notation, "do ij=lbj, ubj, incj", denotes the contents of statement LOOP[j] with index variable ij, lower bound lbj, upper bound ubj, and increment incj.
2. UF[j] >= 1, unroll factor for each LOOP[j].
3. COUNT[j], constant value or symbolic expression for number of iterations executed by LOOP[j], where UF[j] is assumed to be less than or equal to COUNT[j] if COUNT[j] is a constant. It is well known by those skilled in the art to derive COUNT[j] from lbj (lower bound of j), ubj (upper bound of j), and incj (increment of j).

OUTPUT:
1. Updated intermediate representation of the unrolled loops to reflect the loop unrolling transformation specified by UF[1], ..., UF[k].

METHOD:
```
    Set next_parent = parent of LOOP[1] in intermediate representation, the original loop nest;
        Detach subtree rooted at LOOP[1] from next_parent /* this subtree is used as the source
            for generating copies of the original loop body in the unrolled and remainder loops */;
    Set unrolled_body = copy of body of innermost loop, LOOP[k];
    for (j=1; j <= k; j++) {
        Set current_parent = next_parent;
        /* STEP 1: Expand unrolled_body by factor UF[j] for index ij */
            Set new_unrolled_loop_body = copy of unrolled_body;
            for (u=1; u <= UF[j] -1; u++) {
                Set one_copy = copy of unrolled_body;
                replace all references of loop index variable "ij" in one_copy by
                    "ij + incj*u";
                append one_copy to end of new_unrolled_loop_body;
            }
            Delete unrolled_body and set unrolled_body = new_unrolled_loop_body;
        /* STEP 2: Adjust header for unrolled loop j */
            Construct the remainder expression erj = mod(COUNT[j], UF[j]);
            if (COUNT[j] is constant and COUNT[j] == UF[j] ) {
                /* loop j is to be completely unrolled */
                    Construct the statement, "ij=lbj", call it next_parent, and make it the first
                    (leftmost) child of current_parent;
            }
            else {
                Make a copy of the LOOP[j] statement, call it next_parent, change
                it to "do ij=lbj, ubj - erj*incj, UF[j]*incj", and make it a child of current_parent;
            }
        /* STEP 3: Generate remainder loop sub-nest, if necessary */
            if (erj is not a constant 0) {
                Set tree_copy = copy of subtree rooted at LOOP[j];
                change the outermost statement in tree_copy to
                "do ij= ubj - (erj - 1)*incj, ubj, incj";
                Make tree_copy a child of current_parent;
            }
    } /* for (j= ... ) */
    Make unrolled_body a child of next_parent;
    Delete subtree rooted at LOOP[1] (original loop nest);
```

*Fig. 3*

METHOD AND SYSTEM FOR GENERATING COMPACT CODE FOR THE LOOP UNROLLING TRANSFORMATION

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to software optimization that may be used by a programmer or an automatic program optimizer, and more particularly to a technique for generating compact code for the unrolling transformation applied to a perfect nest of loops.

2. Description of the Related Art

Loop unrolling is a well known program transformation used by programmers and program optimizers to improve the instruction-level parallelism and register locality and to decrease the branching overhead of program loops. These benefits arise because creating multiple copies of the loop body provides more opportunities for program optimization. Most optimizing compilers employ the loop unrolling transformation to some degree. In addition, many software packages, especially those for matrix computations, contain library routines in which loops have been hand-unrolled for improved performance.

Historically, the unrolling transformation has been defined for a single loop. More recently, it has been observed that further benefits may be obtained by unrolling multiple nested loops and fusing or jamming together unrolled copies of inner loops. This "unroll-and jam" transformation has a multiplicative effect on the unroll factors of the individual loops, such that the number of copies in the unrolled loop body equals the product of the unroll factors of the individual loops.

A general concern with the aggressive use of unrolling is with the size of the code generated after the loop unrolling transformation is performed, especially when unrolling multiple perfectly nested loops. Apart from creating a larger unrolled loop body, additional loops have to be introduced to correctly handle cases where the unroll factor does not evenly divide the number of iterations. These "remainder" loops substantially increase the compile-time for the transformed code and the size of the final object code, even though only a small fraction of the program's execution time is spent in these remainder loops.

To quantitatively understand the substantial code size increase that may result from applying the unroll-and-jam transformation to multiple loops, let $UF[1], \ldots, UF[k]$ be the unroll factors for a perfect nest of k loops numbered from outermost to innermost. After the conventional unroll-and-jam transformation is applied, the unrolled loop will contain $|UF[1]+mod(1,UF[1])| \times |UF[2]+mod(1,UF[2])| \times \ldots \times |UF[k]+mod(1,UF[k])|$ copies of the loop body for the general and common case of loop bounds that are unknown at compile-time, where "mod(1, UF[i])" is a function that equals zero when $UF[i]=1$ and where the function equals one when $UF[i]>1$. For example, if all k loops have the same unroll factor m where $UF[1]=UF[2]=\ldots=UF[k]=m>1$, then the conventional unroll-and-jam transformation will generate $C'=(m+1)^k$ copies of the loop body in the unrolled code.

More specifically, if the conventional unroll-and-jam transformation is applied to the example code of Table A with m=4 and k=3, then 125 copies will be generated, $C'=125=(4+1)^3$. This generated code is shown in Table C. Note that only 64 copies are in the main unrolled loop body, and that the remaining 65 copies are lower execution frequency remainder loops. Thus, this example clearly illustrates the high proportion of code comprising lower execution frequency remainder loops, as in this example, the prior art generates a greater amount of code in lower execution frequency remainder loops than it does in the higher execution frequency main unrolled loop body.

Thus, conventional techniques of loop unrolling in generating remainder loops substantially increase the compile-time, the size of the object code, and the proportion of the object code comprising lower execution frequency remainder loops. As such, there is a need for a method of, and apparatus for, and article of manufacture for generating smaller more compact code for the unrolling transformation of multiple nested loops.

SUMMARY OF THE INVENTION

The invention disclosed herein comprises a method of, a system for, and an article of manufacture for generating compact code for the unrolling transformation. The present invention substantially reduces the size of the generated code when unrolling multiple nested loops. The present invention substantially reduces the proportion of the object code comprising lower frequency execution remainder loops. The present invention substantially reduces the compile-time of unrolled multiple nested loops.

Given a perfect nest of k multiple loops, the present invention performs a loop unrolling transformation specified by loop unrolling factors $UF[1], \ldots, UF[k]$ and produces an unrolled loop representation as follows. Moving from the outermost loop to the innermost loop of the nest, the invention examines the unroll factor $UF[j]$ of the current loop. The first major step is to expand the separate unrolled loop body by the specified unroll factor $UF[j]$. The second major step is to adjust the loop header for the current loop. If the loop's iteration count, $COUNT[j]$, is known to be less than or equal to the unroll factor, $UF[j]$, then the loop header is simply an assignment of the index variable to the lower-bound expression; otherwise, the loop header is adjusted so that the unrolled loop's iteration count equals $\lfloor COUNT[j]/UF[j] \rfloor$, a rounded down truncation of the division. The third major step is to generate a remainder loop nest, if needed. The body of the remainder loop nest is a single copy of the input loop body. The body of the remainder loop is a cross product of unrolled copies from loops $1 \ldots j-1$ and single copies from loops $j \ldots k$. The remainder loop is not created if it is determined at compile time that the loop length $COUNT[j]$ is a multiple of the unroll factor $UF[j]$.

As opposed to the conventional unroll-and-jam transformation discussed above which produces $|UF[1]+mod(1,UF[1])| \times |UF[2]+mod(1,UF[2])| \ldots \times |UF[k]+mod(1,UF[k])|$ loop copies in the transformed code, the present invention only produces $UF[1] \times \ldots \times UF[k]$ copies of the code from the original loop body in addition to at most $(UF[1] \times \ldots \times UF[k-1])+(UF[1] \times \ldots \times UF[k-2])+\ldots+(UF[1] \times UF[2])+(UF[1])+1$ remainder loops in the transformed code, each containing a single copy of the code from the original loop body. More precisely, the number of remainder loops generated by the present invention is at most: SUM FROM i=1 to k(PRODUCT FROM j=1 to k-i $(UF[j])$). For the k=1 single loop case, the present invention produces the same number of copies as the conventional unroll-and-jam transformation, at most UF[1]+1 copies: UF[1] copies of the unrolled loop and at most one remainder loop. However, for the k≧2 multiple-loop case, the present invention generates substantially fewer lower execution frequency remainder loops than the conventional unroll-and-jam transformation.

Referring back to the example code of Table A where application of the conventional unroll-and-jam transformation produced 125 copies of the loop body, if the unroll transformation of the present invention is applied to the example code of Table A with m=4 and k=3, then only 85 copies will be generated, $C=1+m+m^2+ \ldots +m^k=|m^{(k+1)}-1|/|m-1|=|4^{(3+1)}-1|/|4-1|=85$. The transformed code generated by the present invention for the example code is shown in Table B. Note that only 21 copies (85 total−64 main unrolled loop body copies) of the lower execution frequency remainder loops are generated by the present invention as opposed to the 61 copies of lower execution frequency remainder loops generated by the prior art.

The present invention has the advantage of generating fewer remainder loop statements after unrolling, and hence reducing the compilation time to process the output generated by the unrolling transformation.

The present invention has the further advantage of reducing the code size that results after the unrolling transformation is performed.

BRIEF DESCRIPTION OF THE DRAWINGS

For a more complete understanding of the present invention and the advantages thereof, reference is now made to the Detailed Description in conjunction with the attached Drawings, in which:

FIG. 2 illustrates a symbolic pictorial representation of a partitioning of loop iterations for the simple case of k=2 (a perfect nest of two loops) in accordance with the present invention;

FIG. 3 illustrates psuedo-code comprising the operations preferred in carrying out the present invention;

DESCRIPTION OF THE PREFERRED EMBODIMENT

Figure 1:
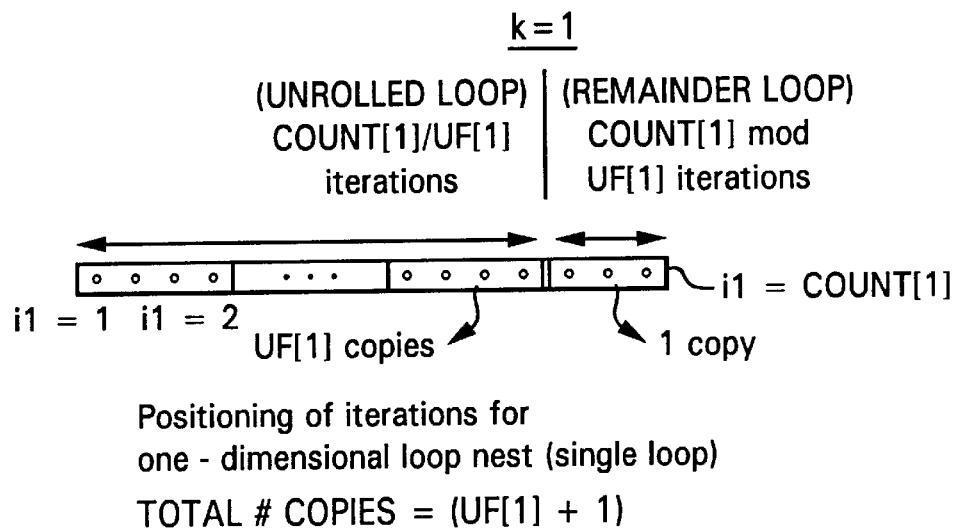
FIG. 1 illustrates a symbolic pictorial representation of a partitioning of loop iterations for the simple case of k=1 (a perfect nest of a single loop) in accordance with the present invention.

Referring now to FIG. 1 and FIG. 2, pictorial representations of partitioning of loop iterations according to the present invention are shown for the simple cases of k=1 (a perfect nest of a single loop) and k=2 (a perfect nest of two loops). FIG. 1 illustrates that application of the present invention to a perfect nest of a single loop (k=1) produces UF[1]+1 copies of the unrolled loop body, UF[1] copies in the unrolled loop and one copy in the remainder loop. FIG. 2 illustrates that application of the present invention to a perfect nest of two loops (k=2) produces UF[1]×UF[2]+UF[1]+1 copies of the unrolled loop body, UF[1]×UF[2] copies in the unrolled loop and UF[1]+1 copies in the remainder loop.

Referring now to Table A, there is shown an example comprising a perfect nest of four loops, the outer three of which are each to be unrolled with an unroll factor of four (UF[1]=UF[2]=UF[3]=4). Thus, the innermost loop is considered a part of the unrolled loop body as the innermost loop is not unrolled in this example.

TABLE A

```
do l = 1, n
  do k = 1, n
    do j = 1, n
      do i = 1, n
        sum = sum + a(i,j,k) + b(i,j,l) + c(i,k,l)
      end do
    end do
  end do
end do
```

Applying the unroll transformation of the present invention to the perfect nest of loops of Table A with unroll factors UF[1]=UF[2]=UF[3]=4 produces the unrolled loop of Table B containing 64 copies of the code from the original loop body (UF[1]× ... × UF[3]=4×4×4=64) and also containing 21 remainder loops, each containing a single copy of the code from the original loop body ((UF[1]× ... ×UF[k−1])+(UF[1]× ... ×UF[k−2])+ ... +(UF[1]×UF[2])+(UF[1])+1=(UF[1]×UF[2])+(UF[1])+1=16+4+1=21).

To understand how the loop unrolling of the present invention can improve register locality, notice that the original loop in Table A has no register locality for arrays a, b, and c as the original loop performs three load operations per iteration. However, the main unrolled loop body in Table B has an abundant amount of register locality, e.g., the value of a(i,j,k) can be loaded once and reused in a register in the first four statements of the unrolled loop body. In fact, of the 64*3=192 references to arrays a, b, and c in the main unrolled loop body, only 48 contain distinct values. If the target processor has sufficient registers to hold these 48 array elements, then the main unrolled loop would only perform 48 load operations. However, the original loop would have performed 192 loads for 64 iterations. Thus, the practice of the present invention reduces the number of load operations performed by a factor of four in this example.

If the program semantics permit reassociation of addition (+) operations, loop unrolling can also help reveal more instruction-level parallelism in this example. For example, a partial sum can be computed for the first 32 statements on one functional unit, another partial sum can be computed in parallel for the remaining 32 statements on another functional unit, and the two partial sums could be combined by a single add operation at the end.

TABLE B

```
do l=1,n - 3,4
 do k=1,n - 3,4
  do j=1,n - 3,4
   do i=1,n,1
    sum = sum + a(i,j,k) + b(i,j,l) + c(i,k,l)
    sum = sum + a(i,j,k) + b(i,j,l + 1) + c(i,k,l + 1)
    sum = sum + a(i,j,k) + b(i,j,l + 2) + c(i,k,l + 2)
    sum = sum + a(i,j,k) + b(i,j,l + 3) + c(i,k,l + 3)
    sum = sum + a(i,j,k + 1) + b(i,j,l) + c(i,k + 1,l)
    sum = sum + a(i,j,k + 1) + b(i,j,l + 1) + c(i,k + 1,l + 1)
    sum = sum + a(i,j,k + 1) + b(i,j,l + 2) + c(i,k + 1,l + 2)
    sum = sum + a(i,j,k + 1) + b(i,j,l + 3) + c(i,k + 1,l + 3)
    sum = sum + a(i,j,k + 2) + b(i,j,l) + c(i,k + 2,l)
    sum = sum + a(i,j,k + 2) + b(i,j,l + 1) + c(i,k + 2,l + 1)
    sum = sum + a(i,j,k + 2) + b(i,j,l + 2) + c(i,k + 2,l + 2)
    sum = sum + a(i,j,k + 2) + b(i,j,l + 3) + c(i,k + 2,l + 3)
    sum = sum + a(i,j,k + 3) + b(i,j,l) + c(i,k + 3,l)
    sum = sum + a(i,j,k + 3) + b(i,j,l + 1) + c(i,k + 3,l + 1)
    sum = sum + a(i,j,k + 3) + b(i,j,l + 2) + c(i,k + 3,l + 2)
    sum = sum + a(i,j,k + 3) + b(i,j,l + 3) + c(i,k + 3,l + 3)
    sum = sum + a(i,j + 1,k) + b(i,j + 1,l) + c(i,k,l)
    sum = sum + a(i,j + 1,k) + b(i,j + 1,l + 1) + c(i,k,l + 1)
    sum = sum + a(i,j + 1,k) + b(i,j + 1,l + 2) + c(i,k,l + 2)
    sum = sum + a(i,j + 1,k) + b(i,j + 1,l + 3) + c(i,k,l + 3)
    sum = sum + a(i,j + 1,k + 1) + b(i,j + 1,l) + c(i,k + 1,l)
    sum = sum + a(i,j + 1,k + 1) + b(i,j + 1,l + 1) + c(i,k + i,l + 1)
    sum = sum + a(i,j + 1,k + 1) + b(i,j + 1,l + 2) + c(i,k + i,l + 2)
    sum = sum + a(i,j + 1,k + 1) + b(i,j + 1,l + 3) + c(i,k + i,l + 3)
    sum = sum + a(i,j + 1,k + 2) + b(i,j + 1,l) + c(i,k + 2,l)
    sum = sum + a(i,j + 1,k + 2) + b(i,j + 1,l + 1) + c(i,k + 2,l + 1)
    sum = sum + a(i,j + 1,k + 2) + b(1,j + 1,l + 2) + c(i,k.+ 2,l + 2)
    sum = sum + a(i,j + 1,k + 2) + b(i,j + 1,l + 3) + c(i,k + 2,l + 3)
    sum = sum + a(i,j + 1,k + 3) + b(i,j + 1,l) + c(i,k + 3,l)
    sum = sum + a(i,j + 1,k + 3) + b(i,j + 1,l + 1) + c(i,k + 3,l + 1)
    sum = sum + a(i,j + 1,k + 3) + b(i,j + 1,l + 2) + c(i,k + 3,l + 2)
    sum = sum + a(i,j + 1,k + 3) + b(i,j + 1,l + 3) + c(i,k + 3,l + 3)
    sum = sum + a(i,j + 2,k) + b(i,j + 2,l) + c(i,k,l)
    sum = sum + a(i,j + 2,k) + b(i,j + 2,l + 1) + c(i,k,l + 1)
    sum = sum + a(i,j + 2,k) + b(i,j + 2,l + 2) + c(i,k,l + 2)
    sum = sum + a(i,j + 2,k) + b(i,j + 2,l + 3) + c(i,k,l + 3)
    sum = sum + a(i,j + 2,k + 1) + b(i,j + 2,l) + c(i,k + 1,l)
    sum = sum + a(i,j + 2,k + 1) + b(i,j + 2,l + 1) + c(i,k + 1,l + 1)
    sum = sum + a(i,j + 2,k + 1) + b(i,j + 2,l + 2) + c(i,k + 1,l + 2)
    sum = sum + a(i,j + 2,k + 1) + b(i,j + 2,l + 3) + c(i,k + 1,l + 3)
    sum = sum + a(i,j + 2,k + 2) + b(i,j + 2,l) + c(1,k + 2,l)
    sum = sum + a(i,j + 2,k + 2) + b(i,j + 2,l + 1) + c(i,k + 2,l + 1)
    sum = sum + a(i,j + 2,k + 2) + b(i,j + 2,l + 2) + c(i,k + 2,l + 2)
    sum = sum + a(i,j + 2,k + 2) + b(i,j + 2,l + 3) + c(i,k + 2,l + 3)
    sum = sum + a(i,j + 2,k + 3) + b(i,j + 2,l) + c(i,k + 3,l)
    sum = sum + a(i,j + 2,k + 3) + b(i,j + 2,l + 1) + c(i,k + 3,l + 1)
    sum = sum + a(i,j + 2,k + 3) + b(i,j + 2,l + 2) + c(i,k + 3,l + 2)
    sum = sum + a(i,j + 2,k + 3) + b(i,j + 2,l + 3) + c(i,k + 3,l + 3)
    sum = sum + a(i,j + 3,k) + b(i,j + 3,l) + c(i,k,l)
    sum = sum + a(i,j + 3,k) + b(i,j + 3,l + 1) + c(i,k,l + 1)
    sum = sum + a(i,j + 3,k) + b(i,j + 3,l + 2) + c(i,k,l + 2)
    sum = sum + a(i,j + 3,k) + b(i,j + 3,l + 3) + c(i,k,l + 3)
    sum = sum + a(i,j + 3,k + 1) + b(i,j + 3,l) + c(i,k + 1,l)
    sum = sum + a(i,j + 3,k + 1) + b(i,j + 3,l + 1) + c(i,k + i,l + 1)
    sum = sum + a(i,j + 3,k + 1) + b(i,j + 3,l + 2) + c(i,k + i,l + 2)
    sum = sum + a(i,j + 3,k + 1) + b(i,j + 3,l + 3) + c(i,k + i,l + 3)
    sum = sum + a(i,j + 3,k + 2) + b(i,j + 3,l) + c(i,k + 2,l)
    sum = sum + a(i,j + 3,k + 2) + b(i,j + 3,l + 1) + c(i,k + 2,l + 1)
    sum = sum + a(i,j + 3,k + 2) + b(i,j + 3,l + 2) + c(i,k + 2,l + 2)
    sum = sum + a(i,j + 3,k + 2) + b(i,j + 3,l + 3) + c(i,k + 2,l + 3)
    sum = sum + a(i,j + 3,k + 3) + b(i,j + 3,l) + c(i,k + 3,l)
    sum = sum + a(i,j + 3,k + 3) + b(i,j + 3,l + 1) + c(i,k + 3,l + 1)
    sum = sum + a(i,j + 3,k + 3) + b(i,j + 3,l + 2) + c(i,k + 3,l + 2)
    sum = sum + a(i,j + 3,k + 3) + b(i,j + 3,l + 3) + c(i,k + 3,l + 3)
   end do
  end do
  do j=j,n,1
   do i=1,n,1
    sum = sum + a(i,j,k) + b(i,j,l) + c(i,k,l)
    sum = sum + a(i,j,k) + b(i,j,l + 1) + c(i,k,l + 1)
    sum = sum + a(i,j,k) + b(i,j,l + 2) + c(i,k,l + 2)
    sum = sum + a(i,j,k) + b(i,j,l + 3) + c(i,k,l + 3)
    sum = sum + a(i,j,k + 1) + b(i,j,l) + c(i,k + 1,l)
    sum = sum + a(i,j,k + 1) + b(i,j,l + 1) + c(i,k + 1,l + 1)
    sum = sum + a(i,j,k + 1) + b(i,j,l + 2) + c(i,k + 1,l + 2)
    sum = sum + a(i,j,k + 1) + b(i,j,l + 3) + c(i,k + 1,l + 3)
    sum = sum + a(i,j,k + 2) + b(i,j,l) + c(i,k + 2,l)
    sum = sum + a(i,j,k + 2) + b(i,j,l + 1) + c(i,k + 2,l + 1)
    sum = sum + a(i,j,k + 2) + b(i,j,l + 2) + c(i,k + 2,l + 2)
    sum = sum + a(i,j,k + 2) + b(i,j,l + 3) + c(i,k + 2,l + 3)
    sum = sum + a(i,j,k + 3) + b(i,j,l) + c(i,k + 3,l)
    sum = sum + a(i,j,k + 3) + b(i,j,l + 1) + c(i,k + 3,l + 1)
    sum = sum + a(i,j,k + 3) + b(i,j,l + 2) + c(i,k + 3,l + 2)
    sum = sum + a(i,j,k + 3) + b(i,j,l + 3) + c(i,k + 3,l + 3)
   end do
  end do
 end do
 do k=k,n,1
  do j=1,n,1
   do i=1,n,1
    sum = sum + a(i,j,k) + b(i,j,l) + c(i,k,l)
    sum = sum + a(i,j,k) + b(i,j,l + 1) + c(i,k,l + 1)
    sum = sum + a(i,j,k) + b(i,j,l + 2) + c(i,k,l + 2)
    sum = sum + a(i,j,k) + b(i,j,l + 3) + c(i,k,l + 3)
   end do
  end do
 end do
end do
do i=l,n,1
 do k=1,n,1
  do j=1,n,1
   do i=1,n,1
    sum = sum + a(i,j,k) + b(i,j,l) + c(i,k,l)
   end do
  end do
 end do
end do
```

The advantages and benefits of the present invention may be appreciated by comparing the 85 copies of the loop body generated by the present invention to the 125 copies generated by the conventional unroll-and-jam transformation of the prior art as shown in Table C. The advantages and benefits of the present invention may be further appreciated by comparing the 21 copies of the lower execution frequency remainder loops generated by the present invention to the 61 copies generated by the conventional unroll-and-jam transformation of the prior art as shown in Table C. Though it may be possible to perform additional loop fusion or loop jamming on some of the remainder loops in the prior art version, the loop fusion will only affect remainder loops and will not reduce the number of copies.

TABLE C

```
do l = 1, n-3, 4
 do k = 1, n-3, 4
  do j = 1, n-3, 4
   do i = 1, n
    sum = sum + a(i,j,k) + b(i,j,l) + c(i,k,l)
    sum = sum + a(i,j+1,k) + b(i,j+1,l) + c(i,k,l)
    sum = sum + a(i,j+2,k) + b(i,j+2,l) + c(i,k,l)
    sum = sum + a(i,j+3,k) + b(i,j+3,l) + c(i,k,l)
    sum = sum + a(i,j,k+1) + b(i,j,l) + c(i,k+1,l)
    sum = sum + a(i,j+1,k+1) + b(i,j+1,l) + c(i,k+1,l)
    sum = sum + a(i,j+2,k+1) + b(i,j+2,l) + c(i,k+1,l)
    sum = sum + a(i,j+3,k+1) + b(i,j+3,l) + c(i,k+1,l)
    sum = sum + a(i,j,k+2) + b(i,j,l) + c(i,k+2,l)
    sum = sum + a(i,j+1,k+2) + b(i,j+1,l) + c(i,k+2,l)
    sum = sum + a(i,j+2,k+2) + b(i,j+2,l) + c(i,k+2,l)
    sum = sum + a(i,j+3,k+2) + b(i,j+3,l) + c(i,k+2,l)
    sum = sum + a(i,j,k+3) + b(i,j,l) + c(i,k+3,l)
    sum = sum + a(i,j+1,k+3) + b(i,j+1,l) + c(i,k+3,l)
    sum = sum + a(i,j+2,k+3) + b(i,j+2,l) + c(i,k+3,l)
    sum = sum + a(i,j+3,k+3) + b(i,j+3,l) + c(i,k+3,l)
    sum = sum + a(i,j,k) + b(i,j,l+1) + c(i,k,l+l)
    sum = sum + a(i,j+1,k) + b(i,j+1,l+1) + c(i,k,l+l)
    sum = sum + a(i,j+2,k) + b(i,j+2,l+1) + c(i,k,l+l)
    sum = sum + a(i,j+3,k) + b(i,j+3,l+1) + c(i,k,l+l)
```

TABLE C-continued

```
        sum = sum + a(i,j,k+1) + b(i,j,l+l) + c(i,k+1,l+1)
        sum = sum + a(i,j+1,k+1) + b(i,j+1,l+1) + c(i,k+1,l+1)
        sum = sum + a(i,j+2,k+1) + b(i,j+2,l+1) + c(i,k+1,l+1)
        sum = sum + a(i,j+3,k+1) + b(i,j+3,l+1) + c(i,k+1,l+1)
        sum = sum + a(i,j,k+2) + b(i,j,l+1) + c(i,k+2,l+1)
        sum = sum + a(i,j+1,k+2) + b(i,j+1,l+1) + c(i,k+2,l+1)
        sum = sum + a(i,j+2,k+2) + b(i,j+2,l+1) + c(i,k+2,l+1)
        sum = sum + a(i,j+3,k+2) + b(i,j+3,l+1) + c(i,k+2,l+1)
        sum = sum + a(i,j,k+3) + b(i,j,l+1) + c(i,k+3,l+1)
        sum = sum + a(i,j+1,k+3) + b(i,j+1,l+1) + c(i,k+3,l+1)
        sum = sum + a(i,j+2,k+3) + b(i,j+2,l+1) + c(i,k+3,l+1)
        sum = sum + a(i,j+3,k+3) + b(i,j+3,l+1) + c(i,k+3,l+1)
        sum = sum + a(i,j,k) + b(i,j,l+2) + c(i,k,l+2)
        sum = sum + a(i,j+1,k) + b(i,j+1,l+2) + c(i,k,l+2)
        sum = sum + a(i,j+2,k) 4 b(1,j+2,l+2) + c(i,k,l+2)
        sum = sum + a(i,j+3,k) + b(i,j+3,l+2) + c(i,k,l+2)
        sum = sum + a(i,j,k+1) + b(i,j,l+2) + c(i,k+1,l+2)
        sum = sum + a(i,j+1,k+1) + b(i,j+1,l+2) + c(i,k+1,l+2)
        sum = sum + a(i,j+2,k+1) + b(i,j+2,l+2) + c(i,k+1,l+2)
        sum = sum + a(i,j+3,k+1) + b(i,j+3,l+2) + c(i,k+1,l+2)
        sum = sum + a(i,j,k+2) + b(i,j,l+2) + c(i,k+2,l+2)
        sum = sum + a(i,j+1,k+2) + b(i,j+1,l+2) + c(i,k+2,l+2)
        sum = sum + a(i,j+2,k+2) + b(i,j+2,l+2) + c(i,k+2,l+2)
        sum = sum + a(i,j+3,k+2) + b(i,j+3,l+2) + c(i,k+2,l+2)
        sum = sum + a(i,j,k+3) + b(i,j,l+2) + c(i,k+3,l+2)
        sum = sum + a(i,j+1,k+3) + b(i,j+1,l+2) + c(i,k+3,l+2)
        sum = sum + a(i,j+2,k+3) + b(i,j+2,l+2) + c(i,k+3,l+2)
        sum = sum + a(i,j+3,k+3) + b(i,j+3,l+2) + c(i,k+3,l+2)
        sum = sum + a(i,j,k) + b(i,j,l+3) + c(i,k,l+3)
        sum = sum + a(i,j+1,k) + b(i,j+1,l+3) + c(i,k,l+3)
        sum = sum + a(i,j+2,k) + b(i,j+2,l+3) + c(i,k,l+3)
        sum = sum + a(i,j+3,k) + b(i,j+3,l+3) + c(i,k,l+3)
        sum = sum + a(i,j,k+1) + b(i,j,l+3) + c(i,k+1,l+3)
        sum = sum + a(i,j+1,k+1) + b(i,j+1,l+3) + c(i,k+1,l+3)
        sum = sum + a(i,j+2,k+1) + b(i,j+2,l+3) + c(i,k+1,l+3)
        sum = sum + a(i,j+3,k+1) + b(i,j+3,l+3) + c(i,k+1,l+3)
        sum = sum + a(i,j,k+2) + b(i,j,l+3) + c(i,k+2,l+3)
        sum = sum + a(i,j+1,k+2) + b(i,j+1,l+3) + c(i,k+2,l+3)
        sum = sum + a(i,j+2,k+2) + b(i,j+2,l+3) + c(i,k+2,l+3)
        sum = sum + a(i,j+3,k+2) + b(i,j+3,l+3) + c(i,k+2,l+3)
        sum = sum + a(i,j,k+3) + b(i,j,l+3) + c(i,k+3,l+3)
        sum = sum + a(i,j+1,k+3) + b(i,j+1,l+3) + c(i,k+3,l+3)
        sum = sum + a(i,j+2,k+3) + b(i,j+2,l+3) + c(i,k+3,l+3)
        sum = sum + a(i,j+3,k+3) + b(i,j+3,l+3) + c(i,k+3,l+3)
      end do
    end do
    do j = j, n
      do i = 1, n
        sum = sum + a(i,j,k) + b(i,j,l) + c(i,k,l)
        sum = sum + a(i,j,k+1) + b(i,j,l) + c(i,k+1,l)
        sum = sum + a(i,j,k+2) + b(i,j,l) + c(i,k+2,l)
        sum = sum + a(i,j,k+3) + b(i,j,l) + c(i,k+3,l)
      end do
    end do
  end do
  do k = k, n
    do j = 1, n-3, 4
      do i = 1, n
        sum = sum + a(i,j,k) + b(i,j,l) + c(i,k,l)
        sum = sum + a(i,j+1,k) + b(i,j+1,l) + c(i,k,l)
        sum = sum + a(i,j+2,k) + b(i,j+2,l) + c(i,k,l)
        sum = sum + a(i,j+3,k) + b(i,j+3,l) + c(i,k,l)
      end do
    end do
    do j = j, n
      do i = 1, n
        sum = sum + a(i,j,k) + b(i,j,l) + c(i,k,l)
      end do
    end do
  end do
end do
do k = 1, n-3, 4
  do j = j, n
    do i = 1, n
      sum = sum + a(i,j,k) + b(i,j,l+1) + c(i,k,l+1)
      sum = sum + a(i,j,k+1) + b(i,j,l+1) + c(i,k+1,l+1)
      sum = sum + a(i,j,k+2) + b(i,j,l+1) + c(i,k+2,l+1)
      sum = sum + a(i,j,k+3) + b(i,j,l+1) + c(i,k+3,l+1)
    end do
  end do
```

TABLE C-continued

```
      end do
    do k = k,n
      do j = 1, n-3, 4
        do i = 1, n
          sum = sum + a(i,j,k) + b(i,j,l+1) + c(i,k,l+1)
          sum = sum + a(i,j+1,k) + b(i,j+1,l+1) + c(i,k,l+1)
          sum = sum + a(i,j+2,k) + b(i,j+2,l+1) + c(i,k,l+1)
          sum = sum + a(i,j+3,k) + b(i,j+3,l+1) + c(i,k,l+1)
        end do
      end do
      do j = j, n
        do i = 1, n
          sum = sum + a(i,j,k) + b(i,j,l+1) + c(i,k,l+1)
        end do
      end do
    end do
  do k = 1, n-3, 4
    do j = j, n
      do i = 1, n
        sum = sum + a(i,j,k) + b(i,j,l+2) + c(i,k,l+2)
        sum = sum + a(i,j,k+1) + b(i,j,l+2) + c(i,k+1,l+2)
        sum = sum + a(i,j,k+2) + b(i,j,l+2) + c(i,k+2,l+2)
        sum = sum + a(i,j,k+3) + b(i,j,l+2) + c(i,k+3,l+2)
      end do
    end do
  end do
  do k = k, n
    do j = 1, n-3, 4
      do i = 1, n
        sum = sum + a(i,j,k) + b(i,j,l+2) + c(i,k,l+2)
        sum = sum + a(i,j+1,k) + b(i,j+1,l+2) + c(i,k,l+2)
        sum = sum + a(i,j+2,k) + b(i,j+2,l+2) + c(i,k,l+2)
        sum = sum + a(i,j+3,k) + b(i,j+3,l+2) + c(i,k,l+2)
      end do
    end do
    do j = j, n
      do i = 1, n
        sum = sum + a(i,j,k) + b(i,j,l+2) + c(i,k,l+2)
      end do
    end do
  end do
  do k = 1, n-3, 4
    do j = j, n
      do i = 1, n
        sum = sum + a(i,j,k) + b(i,j,l+3) + c(i,k,l+3)
        sum = sum + a(i,j,k+1) + b(i,j,l+3) + c(i,k+1,l+3)
        sum = sum + a(i,j,k+2) + b(i,j,l+3) + c(i,k+2,l+3)
        sum = sum + a(i,j,k+3) + b(i,j,l+3) + c(i,k+3,l+3)
      end do
    end do
  end do
  do k = k, n
    do j = 1, n-3, 4
      do i = 1, n
        sum = sum + a(i,j,k) + b(i,j,l+3) + c(i,k,l+3)
        sum = sum + a(i,j+1,k) + b(i,j+1,l+3) + c(i,k,l+3)
        sum = sum + a(i,j+2,k) + b(i,j+2,l+3) + c(i,k,l+3)
        sum = sum + a(i,j+3,k) + b(i,j+3,l+3) + c(i,k,l+3)
      end do
    end do
    do j = j, n
      do i = 1, n
        sum = sum + a(i,j,k) + b(i,j,l+3) + c(i,k,l+3)
      end do
    end do
  end do
end do
do l = l, n
  do k = 1, n-3, 4
    do j = 1, n-3, 4
      do i = 1, n
        sum = sum + a(i,j,k) + b(i,j,l) + c(i,k,l)
        sum = sum + a(i,j+1,k) + b(i,j+1,l) + c(i,k,l)
        sum = sum + a(i,j+2,k) + b(i,j+2,l) + c(i,k,l)
        sum = sum + a(i,j+3,k) + b(i,j+3,l) + c(i,k,l)
        sum = sum + a(i,j,k+1) + b(i,j,l) + c(i,k+1,l)
        sum = sum + a(i,j+1,k+1) + b(i,j+1,l) + c(i,k+1,l)
        sum = sum + a(i,j+2,k+1) + b(i,j+2,l) + c(i,k+1,l)
        sum = sum + a(i,j+3,k+1) + b(i,j+3,l) + c(i,k+1,l)
```

TABLE C-continued

```
        sum = sum + a(i,j,k+2) + b(i,j,l) + c(i,k+2,l)
        sum = sum + a(i,j+1,k+2) + b(i,j+1,l) + c(i,k+2,l)
        sum = sum + a(i,j+2,k+2) + b(i,j+2,l) + c(i,k+2,l)
        sum = sum + a(i,j+3,k+2) + b(i,j+3,l) + c(i,k+2,l)
        sum = sum + a(i,j,k+3) + b(i,j,l) + c(i,k+3,l)
        sum = sum + a(i,j+1,k+3) + b(i,j+1,l) + c(i,k+3,l)
        sum = sum + a(i,j+2,k+3) + b(i,j+2,l) + c(i,k+3,l)
        sum = sum + a(i,j+3,k+3) + b(i,j+3,l) + c(i,k+3,l)
      end do
    end do
    do j = j, n
      do i = 1, n
        sum = sum + a(i,j,k) + b(i,j,l) + c(i,k,l)
        sum = sum + a(i,j,k+1) + b(i,j,l) + c(i,k+1,l)
        sum = sum + a(i,j,k+2) + b(i,j,l) + c(i,k+2,l)
        sum = sum + a(i,j,k+3) + b(i,j,l) + c(i,k+3,l)
      end do
    end do
  end do
  do k = k, n
    do j = 1, n-3, 4
      do i = 1, n
        sum = sum + a(i,j,k) + b(i,j,l) + c(i,k,l)
        sum = sum + a(i,j+1,k) + b(i,j+1,l) + c(i,k,l)
        sum = sum + a(i,j+2,k) + b(i,j+2,l) + c(i,k,l)
        sum = sum + a(i,j+3,k) + b(i,j+3,l) + c(i,k,l)
      end do
    end do
    do j = j, n
      do i = 1, n
        sum = sum + a(i,j,k) + b(i,j,l) + c(i,k,l)
      end do
    end do
  end do
end do
```

Referring next to Table D, psuedo-code illustrating operations preferred in the carrying out of the present invention are shown. This psuedo-code is also illustrated in FIG. 3.

TABLE D

INPUTS:

1. LOOP[1] . . . LOOP[k], a perfect nest of k loops, numbered from outermost to innermost, in an optimizer intermediate representation. The notation, "do $i_j$ = $lb_j$, $ub_j$, $inc_j$", denotes the contents of statement LOOP[j] with index variable $i_j$, lower bound $lb_j$, upper bound $ub_j$, and increment $inc_j$.
2. UF[j] >= 1, unroll factor for each LOOP[j].
3. COUNT[j], constant value or symbolic expression for number of iterations executed by LOOP[j], where UF[j] is assumed to be less than or equal to COUNT[j] if COUNT[j] is a constant. It is well known by those skilled in the art to derive COUNT[j] from $ib_j$ (lower bound of j), $ub_j$ (upper bound of j), and $inc_j$ (increment of j).

OUTPUT:

1. Updated intermediate representation of the unrolled loops to reflect the loop unrolling transformation specified by UF[1], . . ., UF[k].

METHOD:

Set next_parent = parent of LOOP[j] in intermediate representation, the original loop nest;
Detach subtree rooted at LOOP[1] from next_parent/* this subtree is used as the source for generating copies of the original loop body in the unrolled and remainder loops */;
Set unrolled_body = copy of body of innermost loop, LOOP[k];
for(j = 1; j <= k; j++) {
  Set current_parent = next_parent;
  /* STEP 1: Expand unrolled_body by factor UF[j] for index $i_j$ */
  Set new_unrolled_loop_body = copy of unrolled_body;
  for (u = 1; u <= UF[j] − 1; u++) {
    Set one_copy = copy of unrolled_body;
    replace all references of loop index variable "$i_j$" in one_copy by
    "$i_j$ + $inc_j$*u";

TABLE D-continued append one_copy to end of new_unrolled_loop_body;
  }
  Delete unrolled_body and set unrolled_body = new_unrolled_loop_body;
  /* STEP 2: Adjust header for unrolled loop j */
  Construct the remainder expression $er_j$, = mod(COUNT[j], UF[j]);
  if( COUNT[j] is constant and COUNT[j] = UF[j]) {
    /* loop j is to be completely unrolled */
    Construct the statement, "i" = $lb_j$", call it next_parent, and make it the first
    (leftmost) child of current_parent;
  }
  else {
    Make a copy of the LOOP[j] statement, call it next_parent, change
    it to "do $i_j$ = $lb_j$, $ub_j$ − $er_j$*$inc_j$, UF[j]*$inc_j$", and make it a child of
    current_parent;
  }
  /* STEP 3: Generate remainder loop sub-nest, if necessary */
  if ($er_j$ is not a constant 0) {
    Set tree_copy = copy of subtree rooted at LOOP[j];
    change the outermost statement in tree_copy to
    "do $i_j$ = $ub_j$ − ($er_j$−1)*$inc_j$, $ub_j$, $inc_j$";
    Make tree_copy a child of current_parent;
  }
} /* for (j = . . . ) */
Make unrolled_body a child of next_parent;
Delete subtree rooted at LOOP[1] (original loop nest);

Referring next to FIG. 3 through FIG. 6, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language. These flowcharts correspond to the pseudo-code of Table D.

Figure 5:
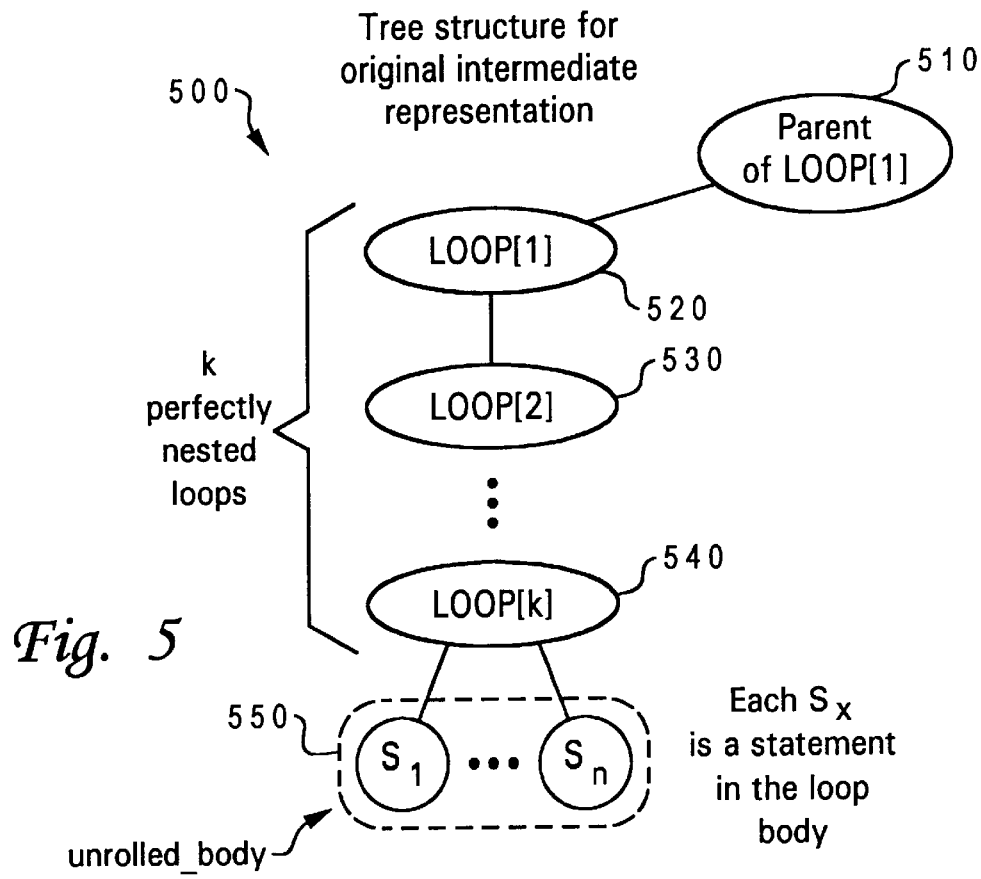
FIG. 5 illustrates a tree structure for an original intermediate representation of loops to be unrolled in accordance with the present invention.
Figure 4:
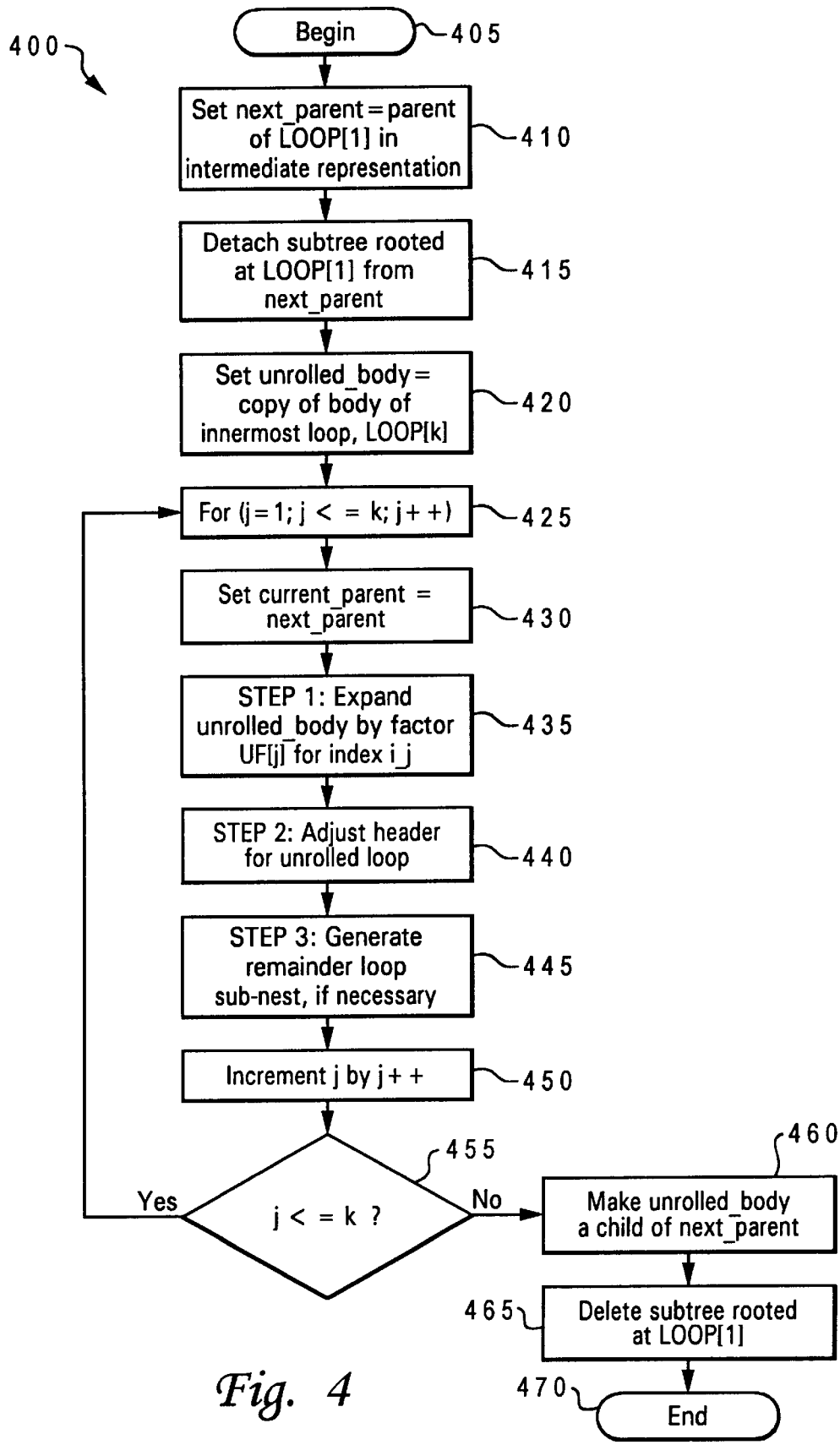
FIG. 4 is a flowchart illustrating the operations preferred in carrying out the present invention.
Figure 6:
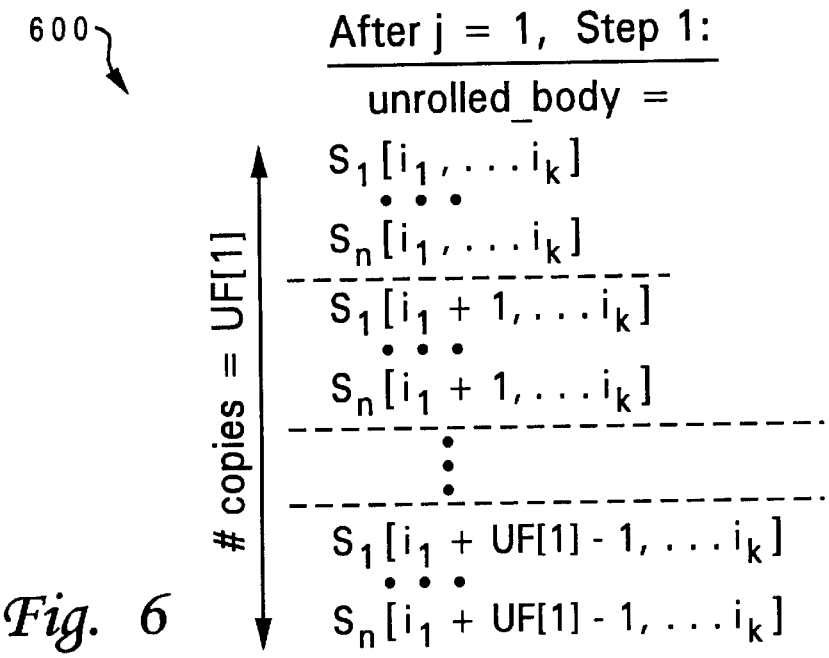
FIG. 6 and FIG. 7 illustrate unrolled loop bodies produced in accordance with the present invention.
Figure 7:
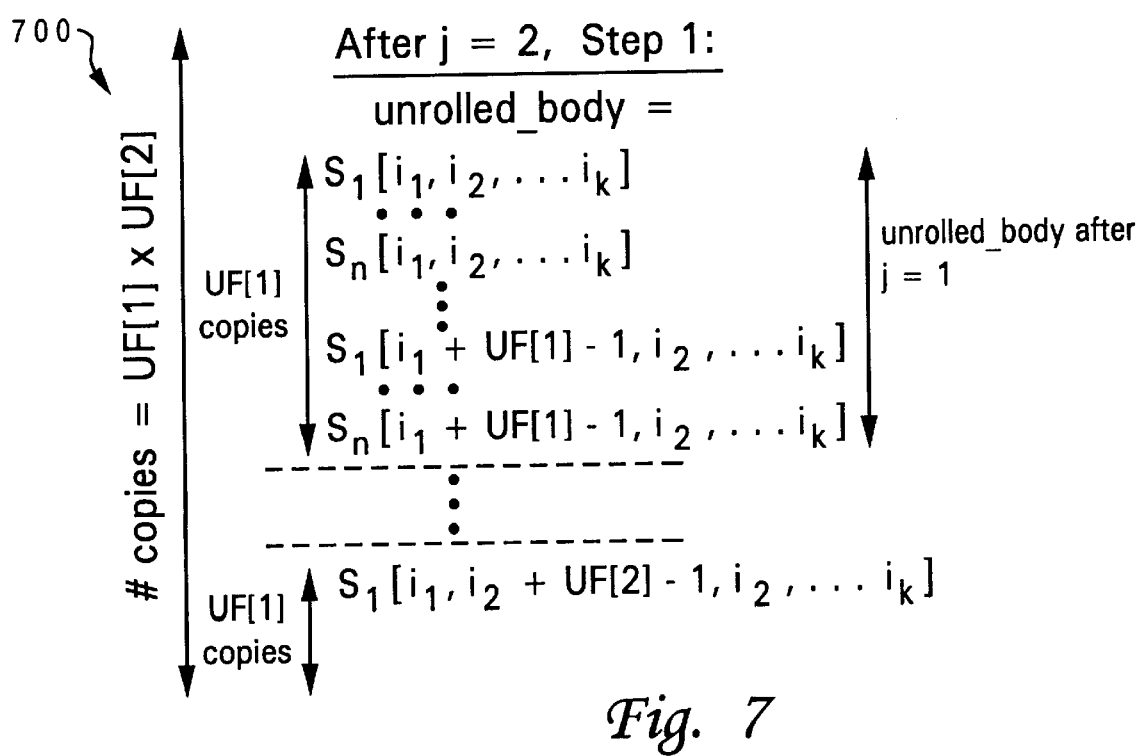

Referring now to FIG. 4, the process of the invention, generally referred to as 400, begins at process block 405. Thereafter, process block 410 sets a next_parent equal to the parent of LOOP[1] in an intermediate representation, and process block 415 detaches a subtree rooted at LOOP[1] from the next_parent. FIG. 5 illustrates the tree structure 500 for the original intermediate representation of the loops to be unrolled comprising a parent 510 of LOOP[1] 520, and k perfectly nested loops comprising LOOP[1] 520, LOOP[2] 530, and LOOP[3] 540. Next, process block 420 sets an unrolled_body 550 equal to a copy of a body of an innermost loop, LOOP[k]. Then, process block 425 begins a for loop with j initialized to 1 and incremented by j++ while j is less than or equal to k. Within this loop, process block 430 sets a current_parent equal to the next_parent, and then performs three steps. Step one, performed by process block 435, expands the unrolled_body by a factor UF[j] for index $i_j$. FIG. 6 illustrates an unrolled body 600 produced by process block 435 after j=1, and FIG. 7 illustrates an unrolled body 700 produced by process block 435 after j=2. Step two, performed by process block 440, adjusts a header for an unrolled loop j. Step three, performed by process block 445, generates a remainder loop sub-nest, if necessary. Thereafter, process block 450 increments the for loop index j by j++, and then decision block 455 determines if the for loop is completed (if j less than or equal to k). If the for loop is not completed, then processing loops back to process block 430 to process the next_parent.

Returning now to decision block 455, if the for loop is completed (if j not less than or equal to k), then process block 460 makes the unrolled_body a child of next_parent, and process block 465 deletes the subtree rooted at LOOP [1]. The process then ends at process block 470.

Figure 8:
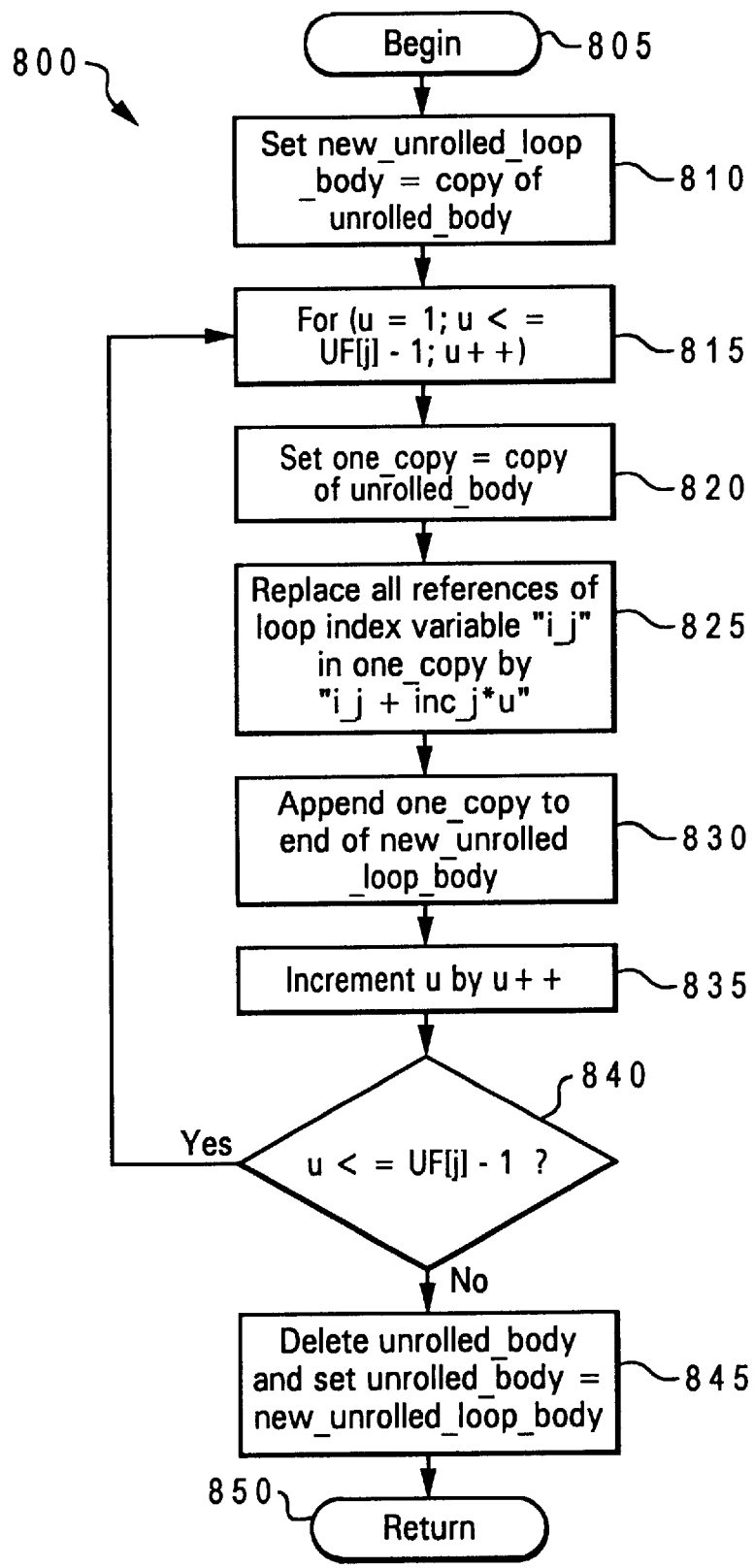
FIG. 8, FIG. 9, and FIG. 10 are additional flowcharts illustrating the operations preferred in carrying out the present invention.

Referring now to FIG. 8, an expansion of process block 435 of FIG. 4, generally referred to as 800, is illustrated. This process 800 performs the first step of expanding the unrolled_body by a factor UF[J] for index $i_j$. The process 800 begins at process block 805, and thereafter, process block 810 sets a new_unrolled_loop_body equal to a copy of the unrolled_body. Then, process block 815 begins a for loop with u initialized to 1 and incremented by u++ while u is less than or equal to UF[j]−1. Within this loop, process block 820 sets one_copy equal to the copy of unrolled_body; process block 825 replaces all references of loop index variable "$i_j$" in one_copy by "$i_j+inc_j*u$"; and process block 830 appends one_copy to the end of new_unrolled_loop_body. Process block 835 then increments the for loop index u by u++, and decision block 840 determines if the for loop is completed (if u less than or equal to UF[j]−1). If the for loop is not completed, then processing loops back to process block 820 to again process one_copy.

Returning now to decision block 840, if the for loop is completed (if u not less than or equal to UF[j]−1), then process block 845 deletes the unrolled_body and sets unrolled_body equal to the new_unrolled_loop_body, and then processing returns through process block 850 to continue processing process block 440 of FIG. 4.

Figure 9:
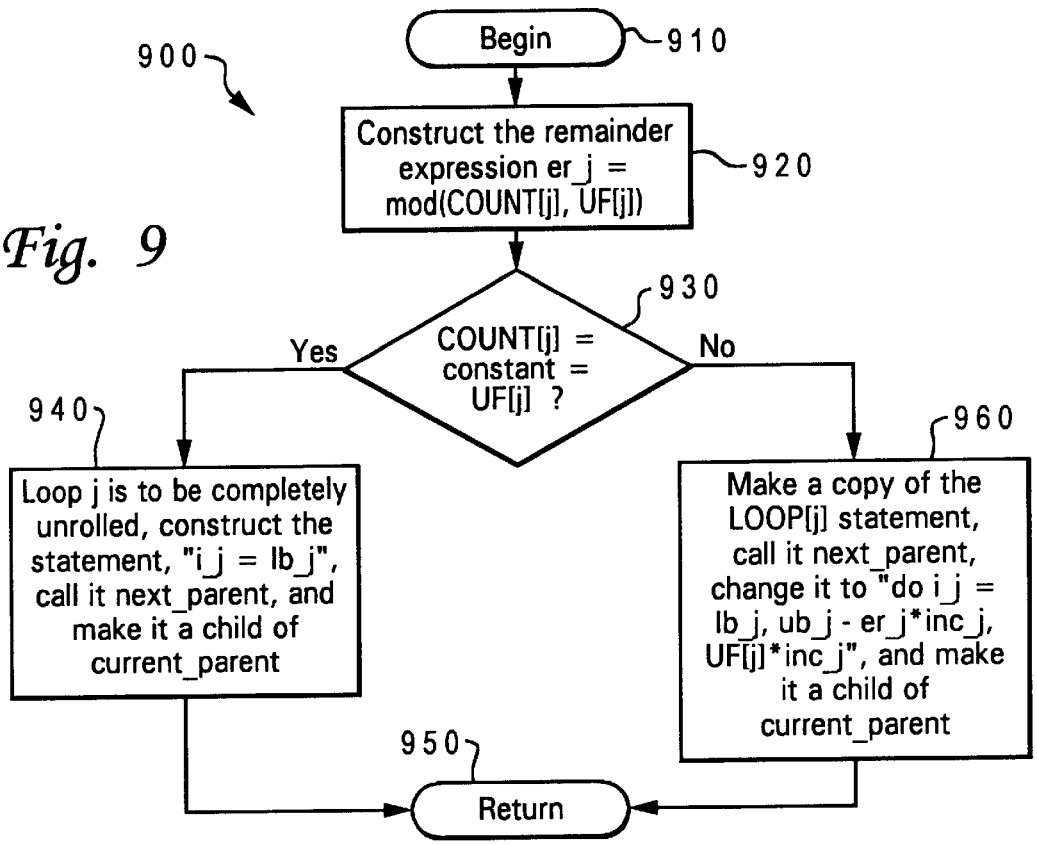

Referring now to FIG. 9, an expansion of process block 440 of FIG. 4, generally referred to as 900, is illustrated. This process 900 performs the second step of adjusting the header for an unrolled loop j. The process 900 begins at process block 905, and thereafter, process block 920 constructs the remainder expression erj which is equal to mod(COUNT[j], UF[j]). Decision block 930 then determines if COUNT[j] is a constant equal to UF[j]. If COUNT[j] is a constant equal to UF[j], then loop j is to be completely unrolled and process block 940 constructs the statement, "$i_j=lb_j$", calls it next_parent, and makes it a child of current_parent, and then processing returns through process block 950 to continue processing process block 445 of FIG. 4.

Returning now to decision block 930, if COUNT[j] is not a constant equal to UF[j], then process block 960 makes a copy of the LOOP[j] statement; calls it next_parent; changes it to "do $i_j lb_j$, $ub_j-er_j*inc_j$, UF[j]*$inc_j$"; and makes it a child of current_parent. Processing then returns through process block 950 to continue processing process block 445 of FIG. 4.

Figure 10:
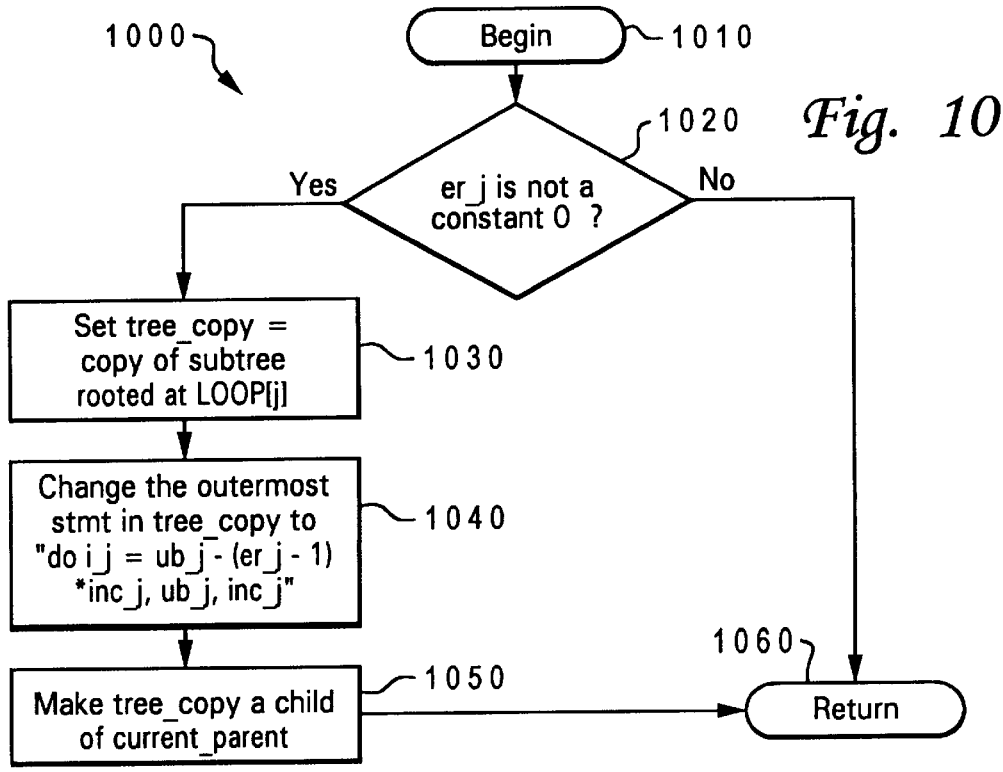

Referring now to FIG. 10, an expansion of process block 445 of FIG. 4, generally referred to as 1000, is illustrated. This process 1000 performs the third step of generating a remainder loop sub-nest, if necessary. The process 1000 begins at process block 1010, and thereafter, decision block 1020 determines if $er_j$ is not a constant equal to 0. If $er_j$ is not a constant equal to 0, then process block 1030 sets tree_copy equal to the copy of subtree rooted at LOOP[j]; process block 1040 changes the outermost statement in tree_copy to "do $i_j=ub_j-(er_j-1)*inc_j$, $ub_j$, $inc_j$"; and process block 1050 makes tree_copy a child of current_parent. Processing then returns through process block 1060 to continue processing process block 450 of FIG. 4.

Returning now to decision block 1020, if $er_j$ is a constant equal to 0, then processing returns through process block 1060 to continue processing process block 450 of FIG. 4.

Figure 11:
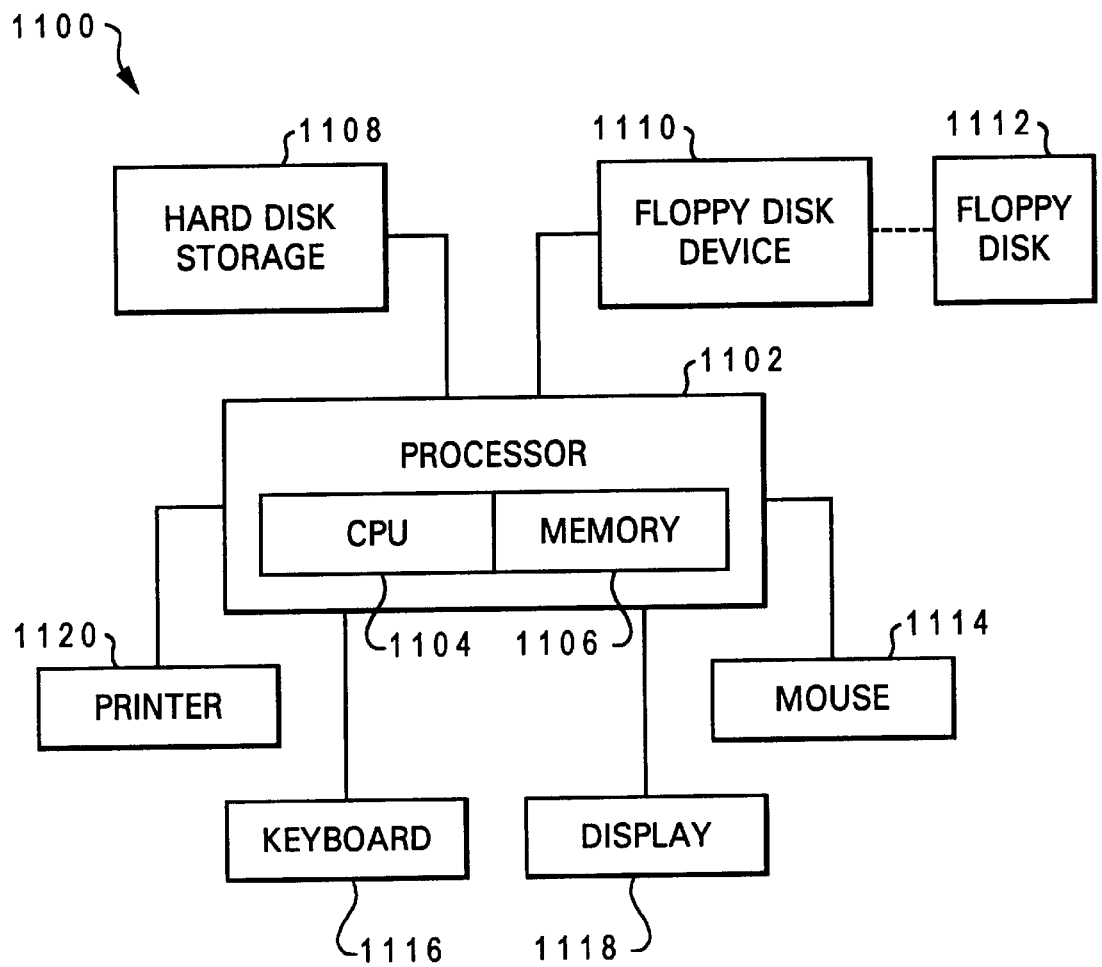
FIG. 11 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 11, a block diagram illustrates a computer system 1100 used in performing the method of the present invention, forming part of the apparatus of the present invention, and which may use the article of manufacture comprising a computer-readable storage medium having a computer program embodied in said medium which may cause the computer system to practice the present invention. The computer system 1100 includes a processor 1102, which includes a central processing unit (CPU) 1104, and a memory 1106. Additional memory, in the form of a hard disk file storage 1108 and a computer-readable storage device 1110, is connected to the processor 1102. Computer-readable storage device 1110 receives a computer-readable storage medium 1112 having a computer program embodied in said medium which may cause the computer system to implement the present invention in the computer system 1100. The computer system 1100 includes user interface hardware, including a mouse 1114 and a keyboard 1116 for allowing user input to the processor 1102 and a display 1118 for presenting visual data to the user. The computer system may also include a printer 1120.

Although the present invention has been particularly shown and described with reference to a preferred embodiment, it will be understood by those skilled in the art that various changes in form and detail may be made without departing from the spirit and the scope of the invention.

We claim:

1. A method of performing a loop unrolling transformation specified by loop unrolling factors UF[1], . . . , UF[k] on a perfect nest of k multiple loops 1, . . . , k, wherein UK[j] is an unrolling factor corresponding to loop j, to produce an unrolled loop representation, said method comprising the steps of:

moving from an outermost loop 1 to an innermost loop k of the nest, examining an unroll factor UF[j] of a current loop j;

expanding a separate unrolled loop body by the specified unroll factor UF[j];

adjusting a loop header for the current loop j, further comprising:

adjusting the loop header to be an assignment of an index variable to a lower-bound expression if an iteration count of the current loop, COUNT[j], is less than or equal to the unroll factor of the current loop, UF[j]; and adjusting the loop header so that the iteration count of the current loop j equals a rounded down truncation of a result of dividing the iteration count of the current loop by the unroll factor of the current loop, $\lfloor$COUNT[j]/UF[j]$\rfloor$, if the iteration count of the current loop, COUNT[j], is not less than or equal to the unroll factor of the current loop, UF[j]; and generating a remainder loop nest if the remainder loop nest is needed to complete the unrolled loop representation.

2. The method of claim 1 wherein the step of generating the remainder loop nest if the remainder loop nest is needed to complete the unrolled loop representation further comprises:

not generating the remainder loop nest if the an iteration count of the current loop, COUNT[j], is a multiple of the unroll factor of the current loop, UF[j].

3. The method of claim 2 wherein a body of the remainder loop nest is a single copy of an input loop body.

4. The method of claim 2 wherein a body of the remainder loop is a cross product of unrolled copies from loops 1, . . . , j−1 and single copies from loops j, . . . , k.

5. The method of claim 1 wherein the step of expanding the separate unrolled loop body by the specified unroll factor UF[j] further comprises:

replacing all occurrences of a loop index variable, $i_j$, for a $j^{th}$ loop, LOOP[j], in the separate unrolled loop body by a summation of the loop index variable, $i_j$, and a product of an increment, $inc_j$, of the $j^{th}$ loop, LOOP[j], and an unroll variable, u, wherein the unroll variable, u, is incremented from one to the specified unroll factor UF[j] corresponding to each copy of the $j^{th}$ loop, LOOP[j], in the separate unrolled loop body.

6. The method of claim 1 wherein the step of expanding the separate unrolled loop body by the specified unroll factor UF[j] further comprises:

generating an assignment statement of the form "$i_j=i_j+inc_j$" at a start of each instance of the separate unrolled loop body.

7. An article of manufacture for use in a computer system for performing a loop unrolling transformation specified by loop unrolling factors UF[1], . . . UF[k] on a perfect nest of k multiple loops 1, . . . , k, wherein UF[j] is an unrolling factor corresponding to loop j, to produce an unrolled loop representation, said article of manufacture comprising a computer-readable storage medium having a computer program embodied in said medium which may cause the computer system to:

move from an outermost loop 1 to an innermost loop k of the nest, examining an unroll factor UF[j] of a current loop j;

expand a separate unrolled loop body by the specified unroll factor UF[j];

adjust a loop header for the current loop j, which may further cause the computer system to:

adjust the loop header to be an assignment of an index variable to a lower-bound expression if an iteration count of the current loop, COUNT[j], is less than or equal to the unroll factor of the current loop, UF[j]; and adjust the loop header so that the iteration count of the current loop j equals a rounded down truncation of a result of dividing the iteration count of the current loop by the unroll factor of the current loop, ⌊COUNT[j]/UF[j]⌋, if the iteration count of the current loop, COUNT[j], is not less than or equal to the unroll factor of the current loop, UF[j]; and generate a remainder loop nest if the remainder loop nest is needed to complete the unrolled loop representation.

8. The article of manufacture of claim 7 wherein the computer program in causing the computer system to generate the remainder loop nest if the remainder loop nest is needed to complete the unrolled loop representation may further cause the computer system to:

not generate the remainder loop nest if the an iteration count of the current loop, COUNT[j], is a multiple of the unroll factor of the current loop, UF[j].

9. The article of manufacture of claim 8 wherein a body of the remainder loop nest is a single copy of an input loop body.

10. The article of manufacture of claim 8 wherein a body of the remainder loop is a cross product of unrolled copies from loops 1, . . . , j−1 and single copies from loops j, . . . , k.

11. The article of manufacture of claim 7 wherein the computer program in causing the computer system to expand the separate unrolled loop body by the specified unroll factor UF[j] may further cause the computer system to:

replace all occurrences of a loop index variable, $i_j$, for a $j^{th}$ loop, LOOP[j], in the separate unrolled loop body by a summation of the loop index variable, $i_j$, and a product of an increment, $inc_j$, of the $j^{th}$ loop, LOOP[j], and an unroll variable, u, wherein the unroll variable, u, is incremented from one to the specified unroll factor UF[j] corresponding to each copy of the $j^{th}$ loop, LOOP[j], in the separate unrolled loop body.

12. The article of manufacture of claim 7 wherein the computer program in causing the computer system to expand the separate unrolled loop body by the specified unroll factor UF[j] may further cause the computer system to:

generate an assignment statement of the form "$i_j=i_j+inc_j$" at a start of each instance of the separate unrolled loop body.

13. A computer system for performing a loop unrolling transformation specified by loop unrolling factors UF[1], . . . , UF[k] on a perfect nest of k multiple loops 1, . . . , k, wherein UF[j] is an unrolling factor corresponding to loop j, to produce an unrolled loop representation, said computer system comprising:

a movement from an outermost loop 1 to an innermost loop k of the nest, examining an unroll factor UF[j] of a current loop j;

an expansion of a separate unrolled loop body by the specified unroll factor UF[j];

an adjustment of a loop header for the current loop j, which further comprises:

an adjustment of the loop header to be an assignment of an index variable to a lower-bound expression if an iteration count of the current loop, COUNT[j], is less than or equal to the unroll factor of the current loop, UF[j]; and an adjustment of the loop header so that the iteration count of the current loop j equals a rounded down truncation of a result of dividing the iteration count of the current loop by the unroll factor of the current loop, ⌊COUNT[j]/UF[j]⌋, if the iteration count of the current loop, COUNT[j], is not less than or equal to the unroll factor of the current loop, UF[j]; and a generation of a remainder loop nest if the remainder loop nest is needed to complete the unrolled loop representation.

14. The computer system of claim 13 wherein the generation of the remainder loop nest if the remainder loop nest is needed to complete the unrolled loop representation further comprises:

a non-generation of the remainder loop nest if the an iteration count of the current loop, COUNT[j], is a multiple of the unroll factor of the current loop, UF[j].

15. The computer system of claim 14 wherein a body of the remainder loop nest is a single copy of an input loop body.

16. The computer system of claim 14 wherein a body of the remainder loop is a cross product of unrolled copies from loops 1, . . . , j−1 and single copies from loops j, . . . , k.

17. The computer system of claim 13 wherein the expansion of the separate unrolled loop body by the specified unroll factor UF[j] further comprises:

a replacement of all occurrences of a loop index variable, $i_j$, for a $j^{th}$ loop, LOOP[j], in the separate unrolled loop body by a summation of the loop index variable, $i_j$, and a product of an increment, $inc_j$, of the $j^{th}$ loop, LOOP[j], and an unroll variable, u, wherein the unroll variable, u, is incremented from one to the specified unroll factor UF[j] corresponding to each copy of the $j^{th}$ loop, LOOP[j], in the separate unrolled loop body.

18. The computer system of claim 13 wherein the expansion of the separate unrolled loop body by the specified unroll factor UF[j] further comprises:

a generation of an assignment statement of the form "$i_j=i_j+inc_j$" at a start of each instance of the separate unrolled loop body.

* * * * *

UNITED STATES PATENT AND TRADEMARK OFFICE
CERTIFICATE OF CORRECTION

PATENT NO.   : 6,035,125
DATED        : March 7, 2000
INVENTOR(S)  : Khoa Nguyen and Vivek Sarkar It is certified that error appears in the above-identified patent and that said Letters Patent is hereby corrected as shown below:

<u>Title page,</u>
Item [56], References Cited, OTHER PUBLICATIONS,
Title: "…Sofware…" should read -- Software; and "Kurjan eta al," should read -- Kurjan et al., --;
Title: "…Trnasformations…" should read -- Transformations --; and
Title: "…Sofware…" should read -- Software --.

Item [57], ABSTRACT,
Line 10, "UP[j]" should read -- UF[j] --.

<u>Column 12,</u>
Line 53, after "the" (second occurrence), strike "an".

<u>Column 13,</u>
Line 45, after "the" (second occurrence), strike "an".

<u>Column 14,</u>
Line 40, after "the" (second occurrence), strike "an".

Signed and Sealed this

Twenty-ninth Day of October, 2002

Attest:

*Attesting Officer*

JAMES E. ROGAN
*Director of the United States Patent and Trademark Office*